US008005142B2

(12) United States Patent
Kim et al.

(10) Patent No.: US 8,005,142 B2
(45) Date of Patent: Aug. 23, 2011

(54) INTRAPREDICTION ENCODING/DECODING METHOD AND APPARATUS

(75) Inventors: So-young Kim, Yongin-si (KR); Jeong-hoon Park, Seoul (KR); Sang-rae Lee, Suwon-si (KR); Yu-mi Sohn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1450 days.

(21) Appl. No.: 11/478,641

(22) Filed: Jul. 3, 2006

(65) Prior Publication Data
US 2007/0036226 A1    Feb. 15, 2007

(30) Foreign Application Priority Data
Aug. 12, 2005   (KR) .................. 10-2005-0074500

(51) Int. Cl.
*H04N 7/12*    (2006.01)
*G06K 9/46*    (2006.01)

(52) U.S. Cl. .................. 375/240.11; 382/238

(58) Field of Classification Search .................. 382/238; 348/616; 375/240.12, 240.13
See application file for complete search history.

(56) References Cited

U.S. PATENT DOCUMENTS

| 6,341,144 | B1 | 1/2002 | Haskell et al. | |
| 6,697,126 | B2* | 2/2004 | Moni et al. | 348/616 |
| 6,832,005 | B2* | 12/2004 | Malvar | 382/238 |
| 7,289,674 | B2* | 10/2007 | Karczewicz | 382/238 |

FOREIGN PATENT DOCUMENTS
KR    10-2005-0039249 A    4/2005

OTHER PUBLICATIONS

Iain E G Richardson, "Prediction of Intra Macroblocks", H.264/MPEG-4 Part 10: Intra Prediction, Apr. 30, 2003, pp. 1-6.

* cited by examiner

*Primary Examiner* — Gims S Philippe
(74) *Attorney, Agent, or Firm* — Sughrue Mion, PLLC

(57) ABSTRACT

An intraprediction encoding/decoding method and apparatus are provided. The intraprediction encoding method includes forming a flipped reference block by flipping pixels of a reference block used for intraprediction symmetrically with respect to a straight line of a predetermined direction passing through the center of the reference block, and performing intraprediction using the flipped reference block.

15 Claims, 11 Drawing Sheets

INTRAPREDICTION ENCODING/DECODING METHOD AND APPARATUS

CROSS-REFERENCE TO RELATED PATENT APPLICATION

This application claims the benefit of Korean Patent Application No. 10-2005-0074500, filed on Aug. 12, 2005, in the Korean Intellectual Property Office, the disclosure of which is incorporated herein in its entirety by reference.

FIELD OF THE INVENTION

The present invention relates to the intraprediction of a video, and more particularly, to an intraprediction encoding/decoding method and apparatus which improves compression efficiency.

BACKGROUND OF THE INVENTION

According to a video compression standard H.264/MPEG-4 advanced video coding (AVC), a picture is divided into macroblocks for video encoding. After each of the macroblocks is encoded in all encoding modes available in interprediction and intraprediction, an appropriate encoding mode is selected according to bit rates required for encoding of the macroblock and rate-distortion (RD) costs between the original macroblock and a decoded macroblock, and the macroblock is encoded in the selected encoding mode.

In intraprediction, a prediction value of a macroblock to be encoded is calculated using a pixel value of a pixel that is spatially adjacent to the macroblock to be encoded and a difference between the prediction value and the pixel value is encoded, instead of referring to reference pictures, in order to encode macroblocks of a current picture. Modes used in intraprediction are divided into 4×4 intraprediction modes, 8×8 intraprediction modes (in case of a high profile), and 16×16 intraprediction modes.

FIG. 1 illustrates 16×16 intraprediction modes according to H.264, and FIG. 2 illustrates 4×4 intraprediction modes according to H.264.

Referring to FIG. 1, the 16×16 intraprediction modes include a total of 4 modes, i.e., a vertical mode, a horizontal mode, a direct current (DC) mode, and a plane mode. Referring to FIG. 2, the 4×4 intraprediction modes include a total of 9 modes, i.e. a vertical mode, a horizontal mode, a DC mode, a diagonal down-left mode, a diagonal down-right mode, a vertical-right mode, a vertical-left mode, a horizontal-up mode, and a horizontal-down mode.

For example, when a current 4×4 block is predicted according to a mode 0, i.e., the vertical mode of FIG. 2, pixel values of pixels A through D adjacent and above the current 4×4 block are used as pixel values of the current 4×4 block. In other words, the pixel value of the pixel A is used as pixel values of four pixels included in the first column of the current 4×4 block, the pixel value of the pixel B is used as pixel values of four pixels included in the second column of the current 4×4 block, the pixel value of the pixel C is used as pixel values of four pixels included in the third column of the current 4×4 block, and the pixel value of the pixel D is used as pixel values of four pixels included in the fourth column of the current 4×4 block. Next, a difference between the pixel values of pixels of the current 4×4 block predicted using the pixels A through D, and the actual pixel values of pixels included in the original current 4×4 block is obtained and encoded.

In video encoding according to H.264, a current macroblock is encoded in a total of 13 modes including the 4×4 intraprediction modes and the 16×16 intraprediction modes, and is then intraprediction encoded in an encoding mode having the smallest cost. More specifically, the current macroblock is intrapredicted in the four 16×16 intraprediction modes and one having the smallest cost is selected from the 16×16 intraprediction modes. Each of 4×4 sub-blocks of the current macroblock is intrapredicted in the nine 4×4 intraprediction modes and one having the smallest cost is selected for each sub-block from the 4×4 intraprediction modes. The cost of the selected 16×16 intraprediction mode and a sum of the costs of the selected 4×4 intraprediction modes are compared and a mode having the smallest cost is selected.

However, according to prior art, when pixels referred to in intraprediction have a large difference from actual pixels of a current block to be intrapredicted, a residue increases, resulting in inefficient prediction. In other words, according to prior art, since intraprediction is performed only using pixel values of pixels adjacent above and on the left side of a current block to be intrapredicted, an improved encoding method which improves encoding efficiency is required.

SUMMARY OF THE INVENTION

The present invention provides an intraprediction encoding/decoding method and apparatus, in which intraprediction is performed after flipping a reference block used for intraprediction or a current block to be intrapredicted, thereby improving compression efficiency.

According to one aspect of the present invention, there is provided an intraprediction encoding method including forming a flipped reference block by flipping pixels of a reference block used for intraprediction symmetrically with respect to a straight line of a predetermined direction passing through the center of the reference block, and performing intraprediction using the flipped reference block.

According to another aspect of the present invention, there is provided an intraprediction encoding method including forming a flipped current block by flipping pixels of a current block to be intrapredicted symmetrically with respect to a straight line of a predetermined direction passing through the center of the current block, and performing intraprediction on the flipped current block using pixels of a reference block adjacent to the flipped current block.

According to still another aspect of the present invention, there is provided an intraprediction encoding apparatus including a flipping unit and an intraprediction performing unit. The flipping unit forms a flipped reference block by flipping pixels of a reference block used for intraprediction symmetrically with respect to a straight line of a predetermined direction passing through the center of the reference block. The intraprediction performing unit performs intraprediction using the flipped reference block.

According to yet another aspect of the present invention, there is provided an intraprediction encoding apparatus including a flipping unit and an intraprediction performing unit. The flipping unit forms a flipped current block by flipping pixels of a current block to be intrapredicted symmetrically with respect to a straight line of a predetermined direction passing through the center of the current block. The intraprediction unit performs intraprediction on the flipped current block using pixels of a reference block adjacent to the flipped current block.

According to yet another aspect of the present invention, there is provided an intraprediction decoding method, in which an encoded video bitstream is received and intraprediction decoding is performed. The intraprediction decoding method includes extracting intraprediction mode information from the received bitstream and determining an intraprediction mode of a current block among a plurality of intraprediction modes, including an intraprediction mode using a flipped reference block based on the extracted intraprediction mode information, forming the flipped reference block by flipping pixels of a reference block used for intraprediction decoding symmetrically with respect to a straight line of a predetermined direction passing through the center of the reference block if the determined intraprediction mode uses the flipped reference block, and forming a predicted block by performing intraprediction decoding on the current block using the flipped reference block.

According to yet another aspect of the present invention, there is provided an intraprediction decoding method, in which an encoded video bitstream is received and intraprediction decoding is performed. The intraprediction decoding method includes extracting intraprediction mode information from the received bitstream and determining an intraprediction mode of a current block among a plurality of intraprediction modes including an intraprediction mode using a flipped current block based on the extracted intraprediction mode information, forming a predicted block by performing intraprediction on a current block using a reference block adjacent to the current block if the determined intraprediction mode uses the flipped current block, forming the flipped current block by adding an error included in the received bitstream to the predicted block, and forming a decoded current block by flipping pixels of the flipped current block symmetrically with respect to a straight line of a predetermined direction passing through the center of the flipped current block.

According to yet another aspect of the present invention, there is provided an intraprediction decoding apparatus, in which an encoded video bitstream is received and intraprediction decoding is performed. The intraprediction decoding apparatus includes an intraprediction mode determining unit, a flipping unit, and an intraprediction performing unit. The intraprediction mode determining unit extracts intraprediction mode information from the received bitstream and determines an intraprediction mode of a current block among a plurality of intraprediction modes including an intraprediction mode using a flipped reference block based on the extracted intraprediction mode information. The flipping unit forms the flipped reference block by flipping pixels of a reference block used for intraprediction decoding symmetrically with respect to a straight line of a predetermined direction passing through the center of the reference block if the determined intraprediction mode uses the flipped reference block. The intraprediction performing unit forms a predicted block by performing intraprediction decoding on the current block using the flipped reference block.

According to yet another aspect of the present invention, there is provided an intraprediction decoding apparatus, in which an encoded video bitstream is received and intraprediction decoding is performed. The intraprediction decoding apparatus includes an intraprediction mode determining unit, an intraprediction performing unit, an adding unit, and a flipping unit. The intraprediction mode determining unit extracts intraprediction mode information from the received bitstream and determines an intraprediction mode of a current block among a plurality of intraprediction modes including an intraprediction mode using a flipped current block based on the extracted intraprediction mode information. The intraprediction performing unit forms a predicted block by performing intraprediction on a current block using a reference block adjacent to the current block, if the determined intraprediction mode uses the flipped current block. The adding unit forms the flipped current block by adding an error included in the received bitstream to the predicted block. The flipping unit forms a decoded current block by flipping pixels of the flipped current block symmetrically with respect to a straight line of a predetermined direction passing through the center of the flipped current block.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the accompanying drawings.

For some input video data, a difference between an intrapredicted block and the original block can be reduced by performing intraprediction after flipping a reference block used for intraprediction or a current block to be intrapredicted in a predetermined direction, instead of performing intraprediction using sampled pixel values of blocks adjacent and above and on the left side of the current block. Thus, in the present invention, a process of performing intraprediction after flipping the reference block or the current block is added, thereby compressing a video with high compression efficiency. For simplicity, a detailed description about intraprediction modes according to the H.264 video compression standard will not be provided and the discussion will be focused on a process of performing intraprediction after flipping the reference block or the current block in a predetermined direction.

Figure 3:
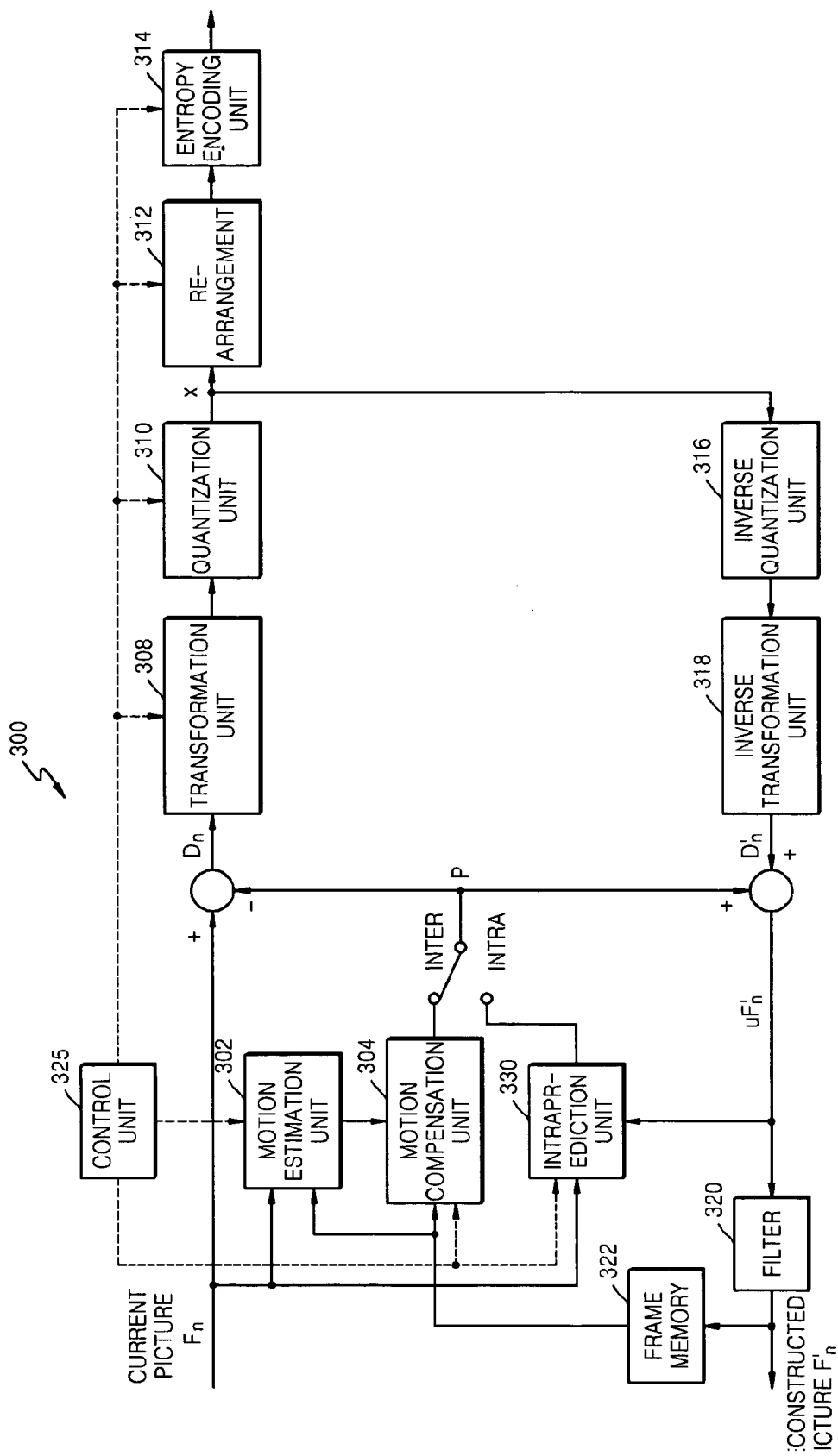
FIG. 3 is a block diagram of a video encoder to which an intraprediction encoding apparatus according to the present invention is applied.

FIG. 3 is a block diagram of a video encoder 300 to which an intraprediction encoding apparatus according to the present invention is applied.

Referring to FIG. 3, the video encoder 300 includes a motion estimation unit 302, a motion compensation unit 304, an intraprediction unit 330, a transformation unit 308, a quantization unit 310, a rearrangement unit 312, an entropy encoding unit 314, an inverse quantization unit 316, an inverse transformation unit 318, a filter 320, a frame memory 322, and a control unit 325. Here, the intraprediction unit 330 corresponds to an intraprediction encoding apparatus according to the present invention.

For intraprediction, the motion estimation unit 302 searches in a reference picture for a prediction value of a macroblock of a current picture. When a reference block is founded in units of a ½ pixel or a ¼ pixel, the motion compensation unit 304 calculates the median pixel value of the reference block to determine reference block data. In this way, interprediction is performed by the motion estimation unit 302 and the motion compensation unit 304.

Figure 1:
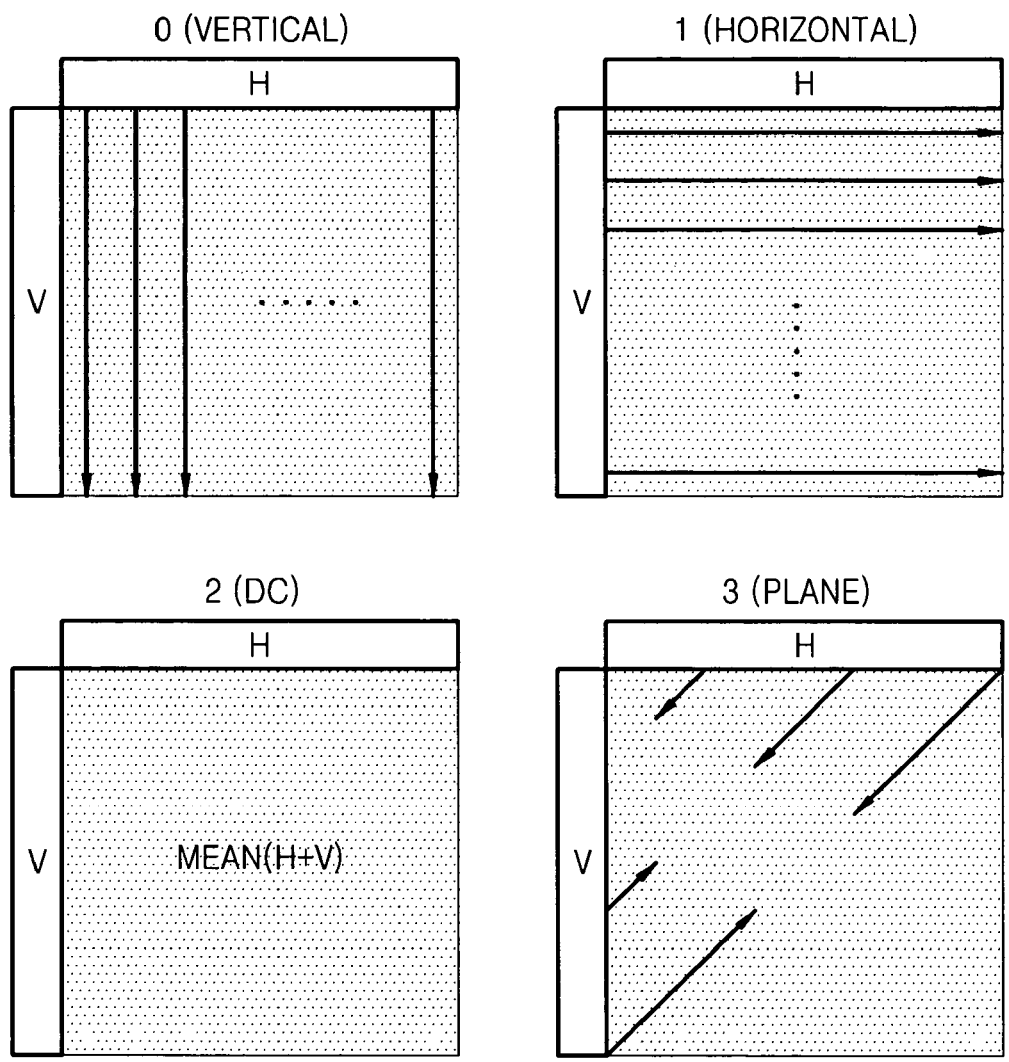
FIG. 1 illustrates 16×16 intraprediction modes according to the H.264 video compression standard.
Figure 2:
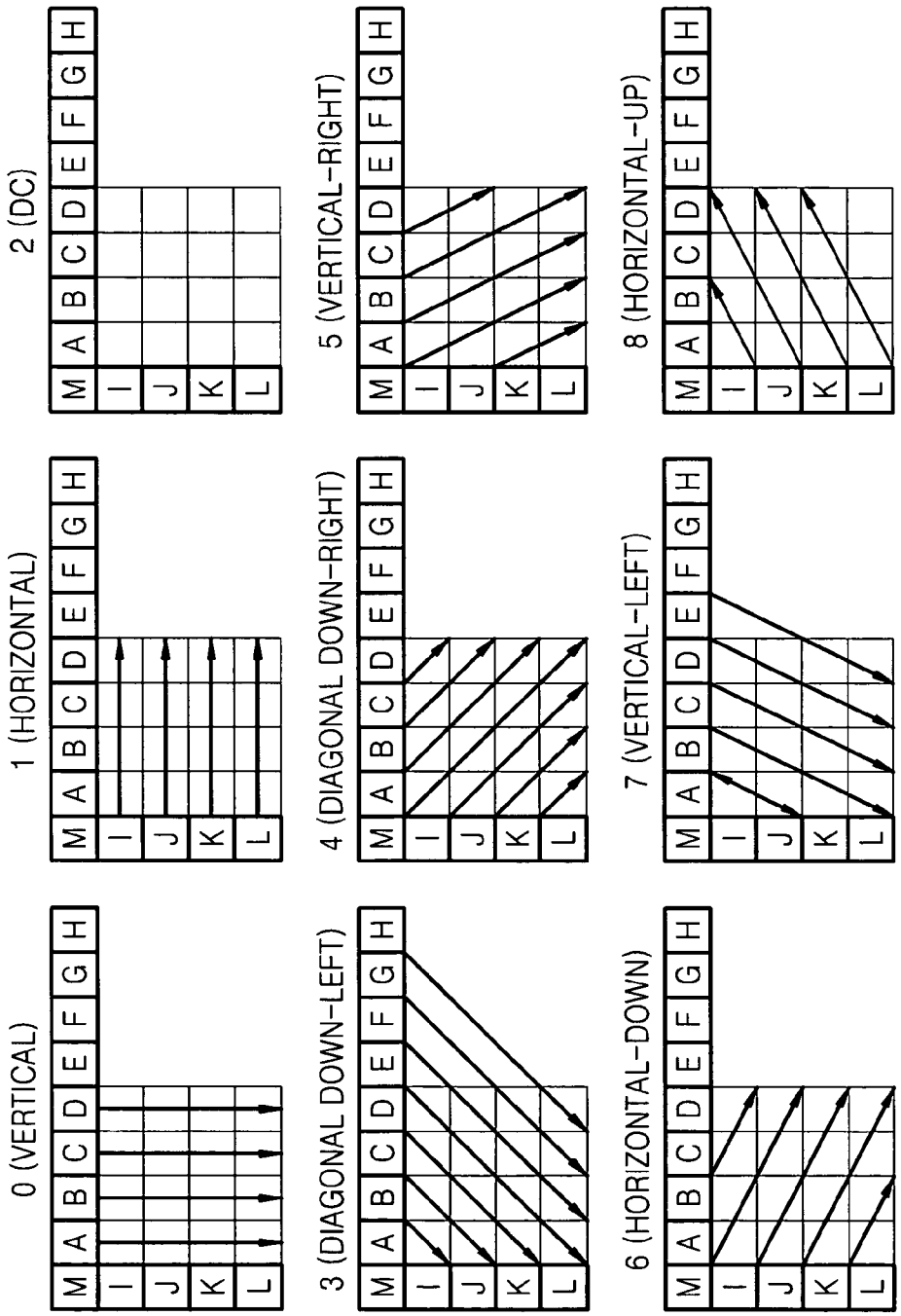
FIG. 2 illustrates intra 4×4 intraprediction modes according to the H.264 video compression standard.

The intraprediction unit 330 searches in a current picture for a prediction value of a macroblock of the current picture for intraprediction. In particular, the intraprediction unit 330 according to the present invention receives a current macroblock to be intrapredicted and performs intraprediction encoding in 16×16 intraprediction modes and 4×4 intraprediction modes as illustrated in FIGS. 1 and 2. In addition, the intraprediction unit 330 according to the present invention forms a flipped block by flipping a reference block used for intraprediction or a current block to be intrapredicted symmetrically with respect to a straight line of a predetermined direction and performs intraprediction using the flipped block.

The control unit 325 controls components of the video encoder 300 and determines a prediction mode that minimizes a difference between an interpredicted or intrapredicted block and the original block. More specifically, the control unit 325 calculates costs of an interpredicted video and an intrapredicted video and determines a prediction mode of a predicted video having the smallest cost as a final prediction mode. Here, cost calculation may be performed using various methods such as a sum of absolute difference (SAD) cost function, a sum of absolute transformed difference (SATD) cost function, a sum of square difference (SSD) cost function, a mean of absolute difference (MAD) cost function, and a Lagrange cost function. An SAD is a sum of absolute values of prediction residues of 4×4 blocks. An SATD is a sum of absolute values of coefficients obtained by applying Hadamard transform on prediction residues of 4×4 blocks. An SSD is a sum of squared prediction residues of 4×4 block prediction samples. An MAD is an average of absolute values of prediction residues of 4×4 block prediction samples. The Lagrange cost function is a modified cost function including bitstream length information.

Once prediction data to be referred to by a macroblock of a current frame is found through interprediction or intraprediction, it is extracted from the macroblock of the current frame, transformed by the transformation unit 308, and then quantized by the quantization unit 310. The remaining portion of the macroblock of the current frame after subtracting a motion-estimated reference block is referred to as a residue. In general, the residue is encoded to reduce the amount of data in video encoding. The quantized residue passes through the rearrangement unit 312 for encoding in the entropy encoding unit 314.

To obtain a reference picture used for interprediction, a quantized picture passes through the inverse quantization unit 316 and the inverse transformation unit 318 and thus, a current picture is reconstructed. The reconstructed current picture passes through the filter 320 performing deblocking filtering and is then stored in the frame memory 322 for use in interprediction of a next picture.

Figure 4:
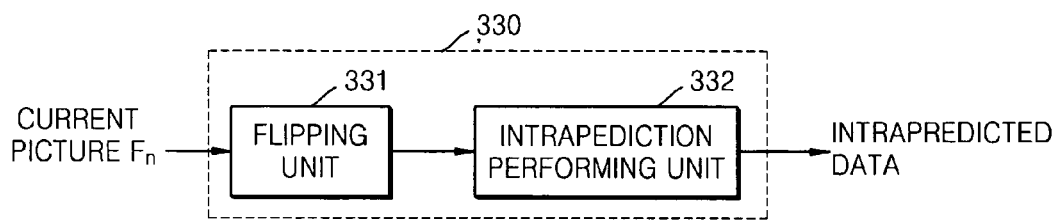
FIG. 4 is a block diagram of an intraprediction unit of FIG. 3 according to the present invention.

FIG. 4 is a block diagram of the intraprediction unit 330 of FIG. 3 according to the present invention.

Referring to FIG. 4, the intraprediction unit 330 includes a flipping unit 331 and an intraprediction performing unit 332.

The flipping unit 331 receives video data input in units of a macroblock and forms a flipped block by flipping a reference block used for intraprediction, i.e., a block located above or on the left side of a current block to be intrapredicted, or the current block symmetrically with respect to a straight line of a predetermined direction.

The intraprediction performing unit 332 performs intraprediction using the flipped reference block or the flipped current block formed by the flipping unit 331.

Figure 5:
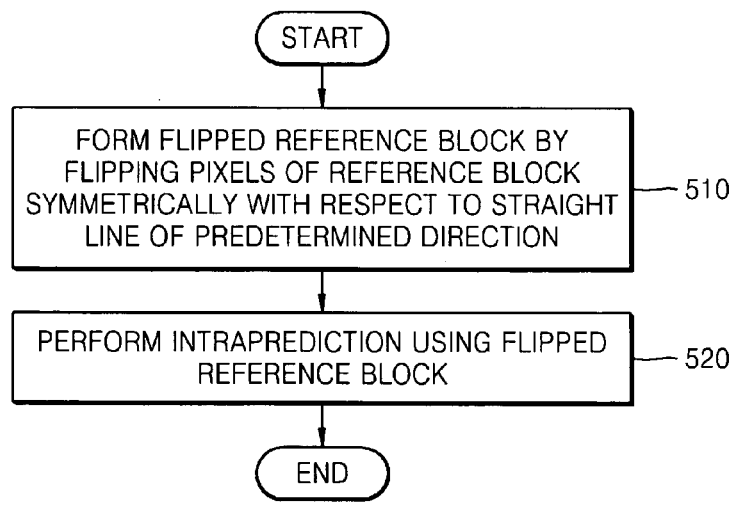
FIG. 5 is a flowchart illustrating an intraprediction encoding method according to a first exemplary embodiment of the present invention.

FIG. 5 is a flowchart illustrating an intraprediction encoding method according to a first exemplary embodiment of the present invention. In the intraprediction encoding method according to the first exemplary embodiment of the present invention, a reference block used for intraprediction is flipped in a predetermined direction and the flipped reference block is used for intraprediction.

Referring to FIGS. 4 and 5, the flipping unit 331 forms a flipped reference block by flipping pixels of the reference block symmetrically with respect to a straight line of a predetermined direction passing through the center of the reference block in operation 510. As mentioned above, the reference block means a block located above or on the left side of a current block of a predetermined size to be intrapredicted. Since blocks located above and on the left side of the current block are already encoded and reconstructed according to a general block processing order, they can be used as reference data for prediction in video encoding and decoding.

In operation 520, the intraprediction performing unit 332 performs intraprediction using the flipped reference block according to the size of the current block in prediction directions as illustrated in FIGS. 1 and 2. In other words, the intraprediction performing unit 332 according to the first exemplary embodiment of the present invention forms a flipped reference block by flipping pixels of the reference block symmetrically with respect to a straight line of a predetermined direction passing through the center of the reference block and performs intraprediction using pixels of the flipped reference block.

When intraprediction is performed using the flipped reference block, the intraprediction performing unit 332 may add intraprediction mode information including information on whether the flipped reference block is used and the predetermined direction of the straight line to a header of a bitstream of an encoded video.

Figure 6A:
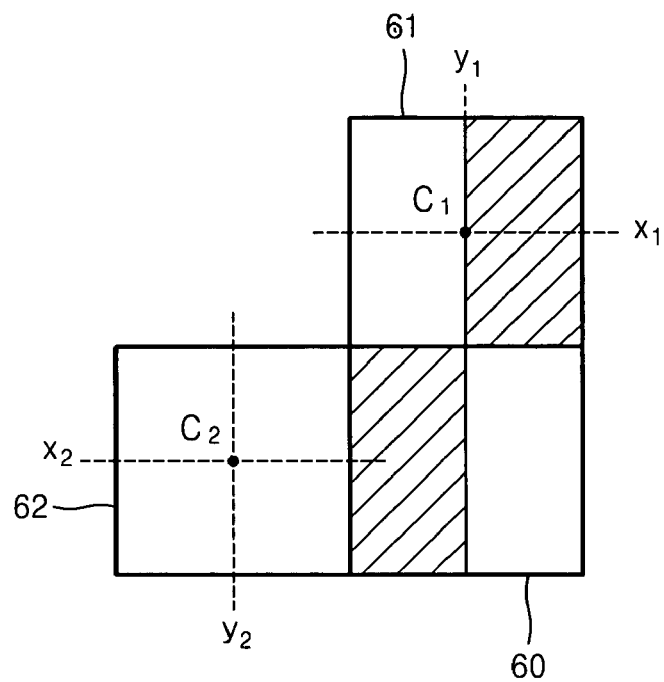
FIGS. 6A and 6B are views for explaining intraprediction encoding of the intraprediction encoding method according to the first exemplary embodiment of the present invention.
Figure 6B:
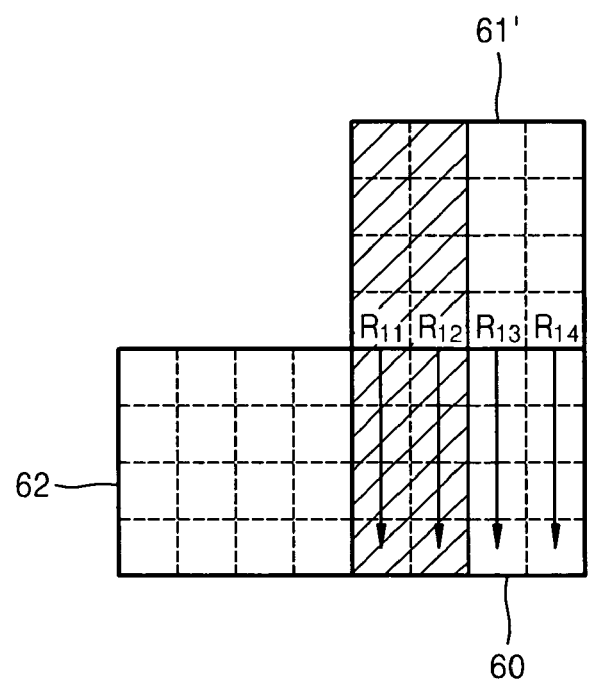

FIGS. 6A and 6B are views for explaining intraprediction encoding of the intraprediction encoding method according to the first exemplary embodiment of the present invention. In FIGS. 6A and 6B, a reference numeral 60 indicates a current block to be intrapredicted, a reference numeral 61 indicates a first reference block adjacent and above the current block 60, a reference numeral 61' indicates a flipped first reference block formed by flipping pixels of the first reference block 61 symmetrically with respect to a straight line $y_1$, and a reference numeral 62 indicates a second reference block adjacent and on the left side of the current block 60.

Referring to FIG. 6A, the current block 60 is symmetric to the first reference block 61 adjacent above the current block 60 with respect to the straight line $y_1$ of a vertical direction. According to conventional intraprediction encoding, since intraprediction is performed without considering symmetry between adjacent blocks, a difference between a predicted block and the original block increases, resulting in inefficient intraprediction. In the intraprediction encoding method according to the first exemplary embodiment of the present invention, a flipped reference block is formed by flipping pixels of the first reference block 61 or the second reference block 62 with respect to a straight line of a predetermined direction and intraprediction is performed using the flipped reference block, thereby efficiently performing intraprediction based on symmetry between blocks.

Referring to FIG. 6B, the flipped first reference block 61' is formed by flipping pixels of the first reference block 61 symmetrically with respect to the straight line $y_1$ of the vertical direction passing through a center $C_1$ of the first reference block 61. Next, intraprediction is performed in a mode 0, i.e., in a vertical mode among intraprediction modes illustrated in FIG. 2. By performing intraprediction in the vertical mode using pixels $R_{11}, R_{12}, R_{13}$, and $R_{14}$ adjacent above the current block 60 among pixels of the flipped first reference block 61', a difference between a predicted block and the original block is 0, thereby reducing a residue.

Figure 7:
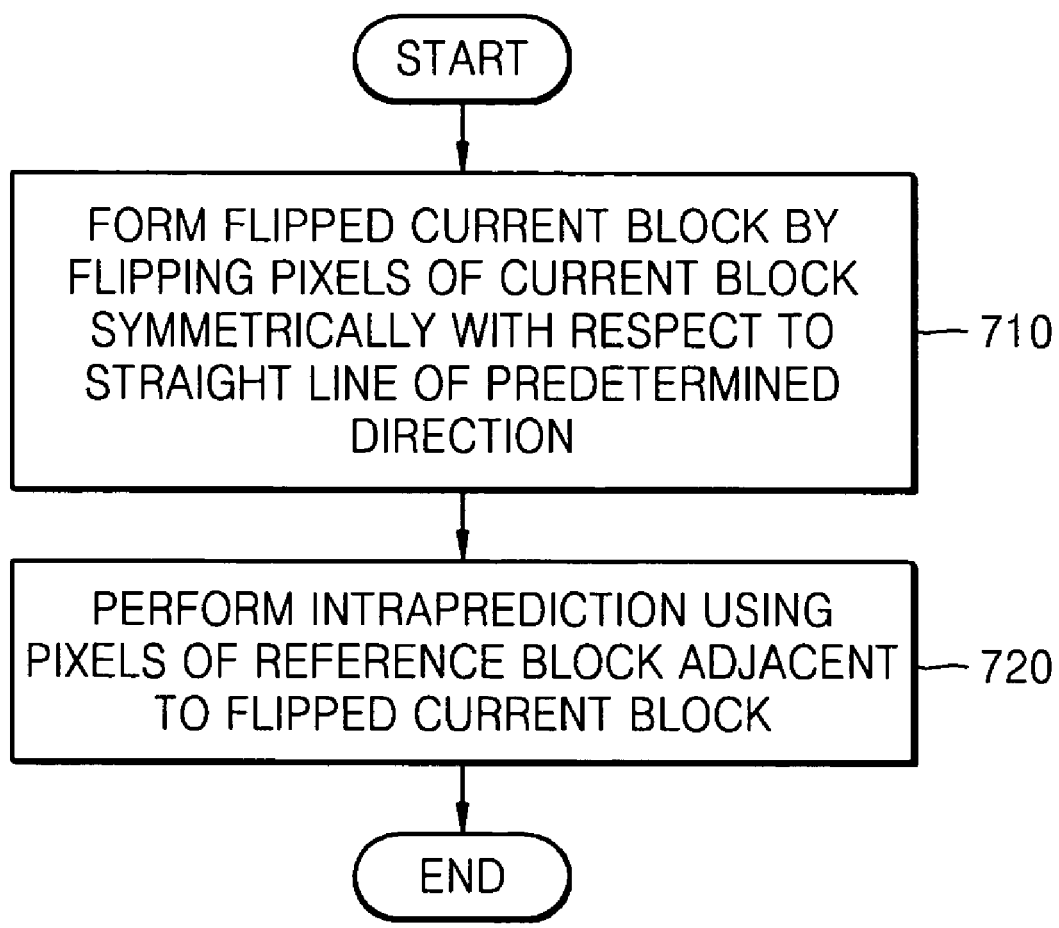
FIG. 7 is a flowchart illustrating an intraprediction encoding method according to a second exemplary embodiment of the present invention.

FIG. 7 is a flowchart illustrating an intraprediction encoding method according to a second exemplary embodiment of the present invention. In the intraprediction encoding method according to the second exemplary embodiment of the present invention, a current block to be intrapredicted is flipped in a predetermined direction and intraprediction is performed on the flipped current block.

Referring to FIG. 7, in operation 710, the flipping unit 331 forms a flipped current block by flipping the current block symmetrically with respect to a straight line of a predetermined direction passing through the center of the current block.

In operation 720, the intraprediction performing unit 332 performs intraprediction using a reference block adjacent and above or on the left side of the flipped current block in intraprediction modes as illustrated in FIGS. 1 and 2. In the intraprediction encoding method according to the second exemplary embodiment of the present invention, a current block to be intrapredicted is flipped in a predetermined direction and then intraprediction is performed on the flipped current block in addition to a conventional intraprediction encoding process, and prediction directions in intraprediction are the same as conventional directions.

When intraprediction is performed using the flipped current block, the intraprediction performing unit 332 may add intraprediction mode information including information on whether the flipped current block is used and the predetermined direction of the straight line to a header of a bitstream of an encoded video.

Figure 8A:
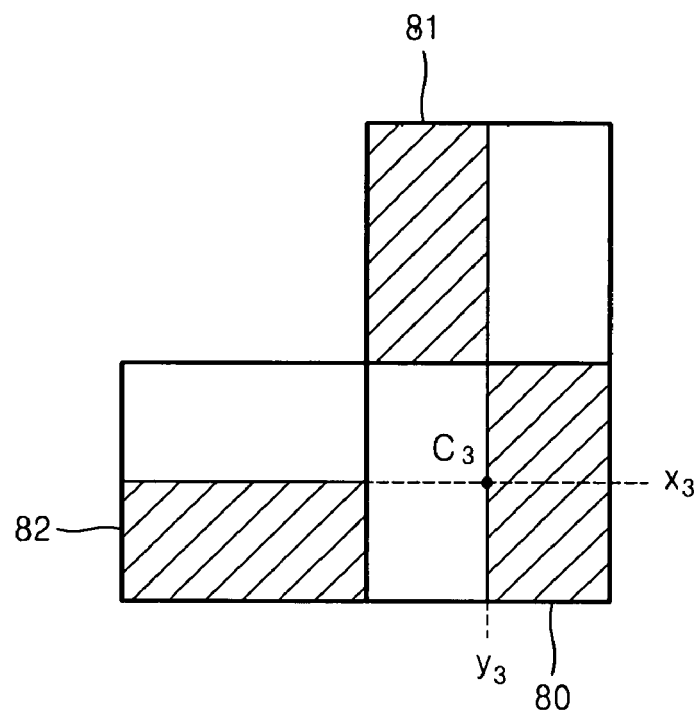
FIGS. 8A and 8B are views for explaining intraprediction encoding of the intraprediction encoding method according to the second exemplary embodiment of the present invention.
Figure 8B:
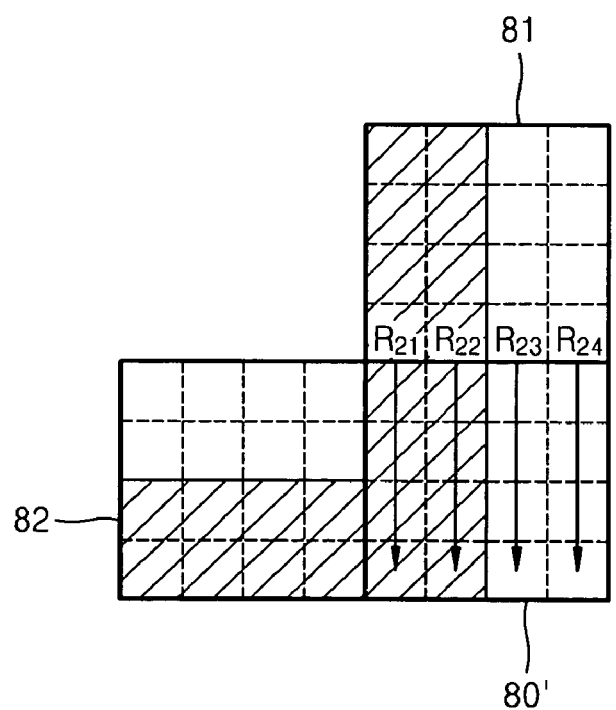

FIGS. 8A and 8B are views for explaining intraprediction encoding using the intraprediction encoding method according to the second exemplary embodiment of the present invention.

In FIGS. 8A and 8B, a reference numeral 80 indicates a current block to be intrapredicted, a reference numeral 80' indicates a flipped current block formed by flipping pixels of the current block 80 symmetrically with respect to a straight line $y_3$, a reference numeral 81 indicates a first reference block adjacent and above the current block 80, and a reference numeral 82 indicates a second reference block adjacent on the left side of the current block 80.

Referring to FIG. 8A, the current block 80 is symmetric to the first reference block 81 adjacent and above the current block 80 with respect to the straight line $y_3$ of a vertical direction. In this case, while a first reference block is flipped in the intraprediction encoding method according to the first exemplary embodiment of the present invention, the current block 80 is flipped and is then intrapredicted in the intraprediction encoding method according to the second exemplary embodiment of the present invention.

Referring to FIG. 8B, the flipped current block 80' is formed by flipping pixels of the current block 80 symmetrically with respect to the straight line $y_3$ of the vertical direction passing through a center $C_3$ of the current block 80. Next, intraprediction is performed in a vertical mode. In other words, intraprediction is performed in the vertical mode using pixels $R_{21}, R_{22}, R_{23}$, and $R_{24}$ adjacent and above the flipped current block 80' among pixels of the first reference block 81.

While intraprediction is performed on a 4×4 block in the above description, an intraprediction method according to the present invention can also be applied to intraprediction of an 8×8 block or a 16×16 block. According to characteristics of a video, the direction of the straight line may vary, for example, in a vertical or horizontal direction. The present invention can also be applied, not only to a case where blocks of a video are entirely symmetric to each other as illustrated in FIGS. 6A and 8A, but also to a case where intraprediction using a flipped video produces superior compression efficiency even when blocks of a video are not entirely symmetric to each other.

Figure 9:
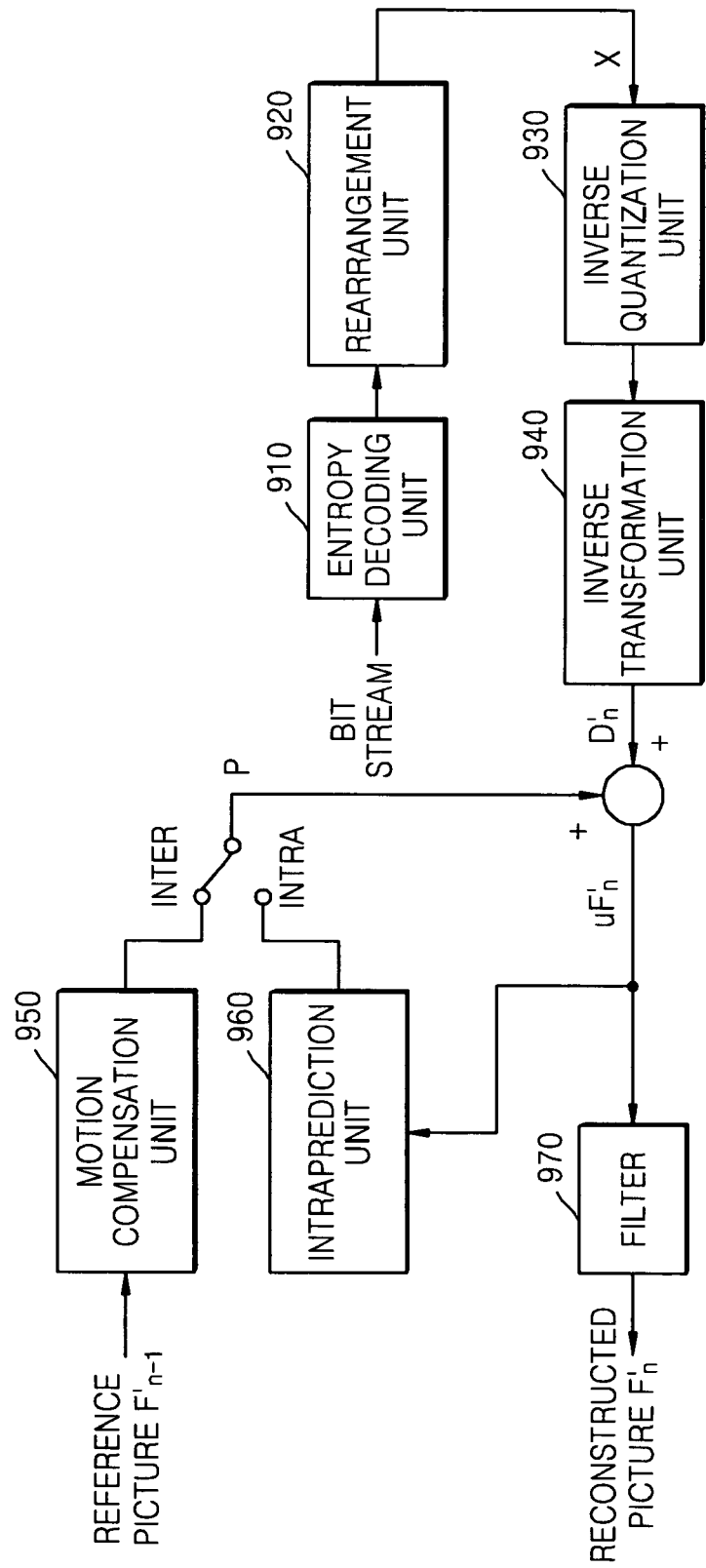
FIG. 9 is a block diagram of a video decoder to which an intraprediction decoding apparatus according to the present invention is applied.

FIG. 9 is a block diagram of a video decoder to which an intraprediction decoding apparatus according to the present invention is applied.

Referring to FIG. 9, the video decoder includes an entropy decoding unit 910, a rearrangement unit 920, an inverse quantization unit 930, an inverse transformation unit 940, a motion compensation unit 950, an intraprediction unit 960, and a filter 970. Here, the intraprediction unit 960 corresponds to the intraprediction decoding apparatus according to the present invention.

The entropy decoding unit 910 and the rearrangement unit 920 receive a compressed bitstream and perform entropy decoding, thereby generating a quantized coefficient X. The inverse quantization unit 930 and the inverse transformation unit 940 perform inverse quantization and inverse transformation on the quantized coefficient X, thereby extracting transformation encoding coefficients, motion vector information, header information, and intraprediction mode information. The motion compensation unit 950 and the intraprediction unit 960 generate a predicted block according to an encoded picture type using decoded header information, and the predicted block is added to an error $D'_n$ to generate $uF'_n$. $uF'_n$ passes through the filter 314 and thus, a reconstructed picture $F'_n$ is generated.

The intraprediction unit 960 according to the present invention determines an intraprediction mode of a current block using the intraprediction mode information included in the received bitstream and decodes a video by flipping a reference block or a predicted block of an intrapredicted current block.

Figure 10:
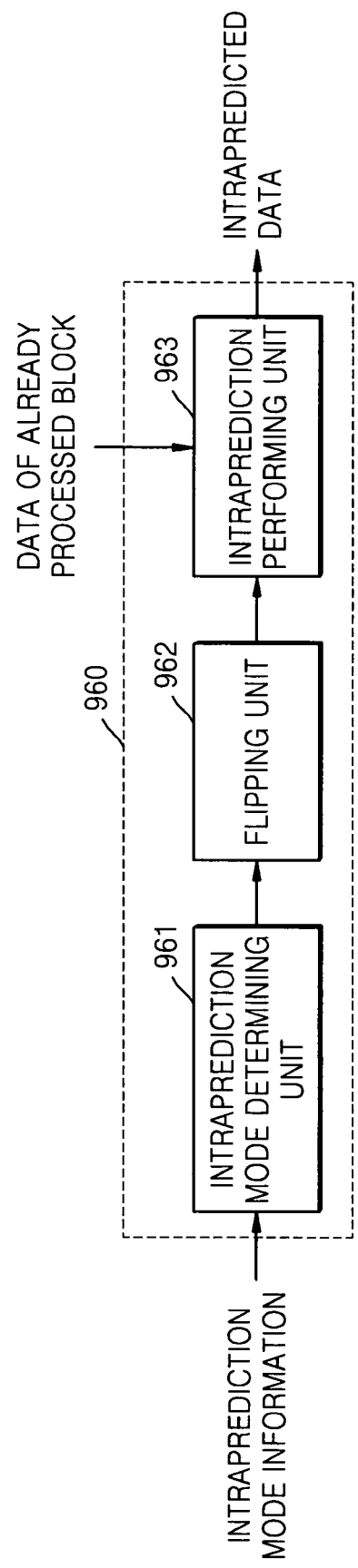
FIG. 10 is a block diagram of an intraprediction unit of FIG. 9 according to the present invention.

FIG. 10 is a block diagram of the intraprediction unit 960 of FIG. 9 according to the present invention.

Referring to FIG. 10, the intraprediction unit 960 includes an intraprediction mode determining unit 961, a flipping unit 962, and an intraprediction performing unit 963.

The intraprediction mode determining unit 961 determines which intraprediction mode among various intraprediction modes including the intraprediction encoding methods according to the first and second exemplary embodiments of the present invention is used for intraprediction encoding of a current block using the intraprediction mode information extracted from the received bitstream.

Figure 11:
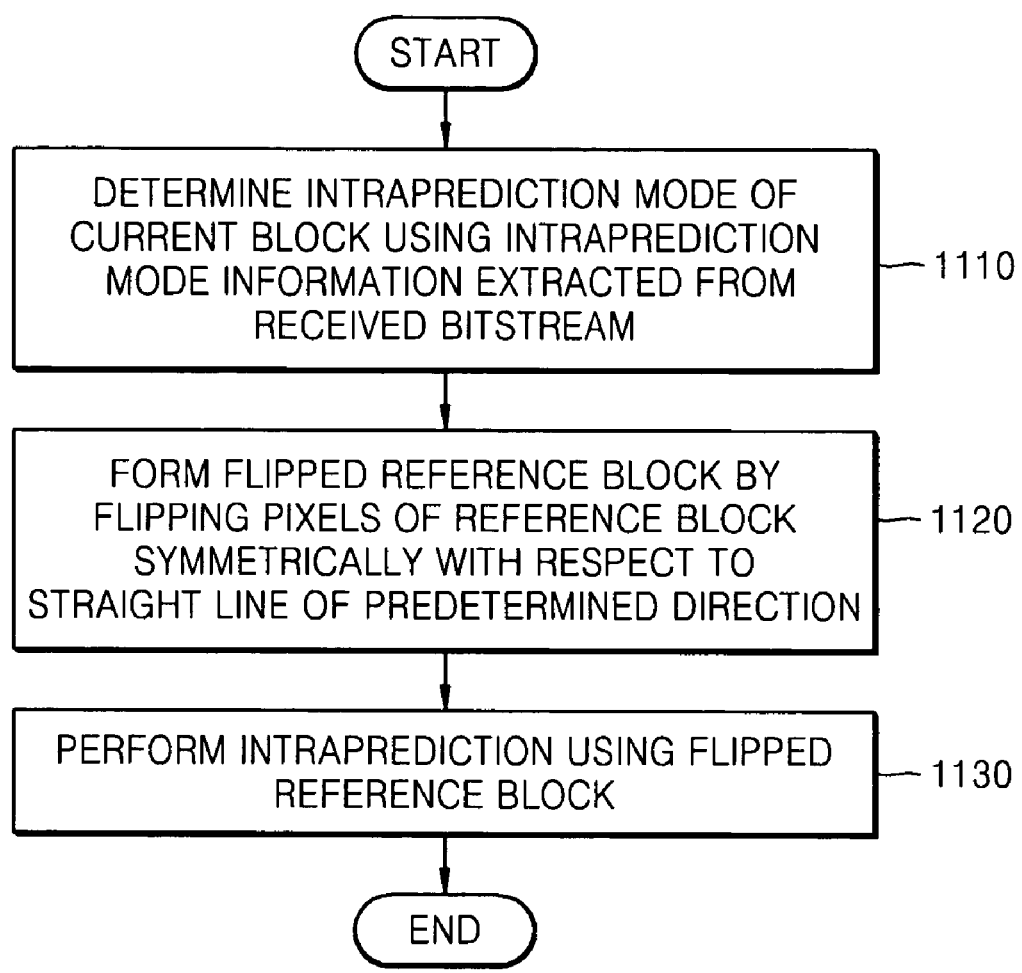
FIG. 11 is a flowchart illustrating an intraprediction decoding method according to a first exemplary embodiment of the present invention.

FIG. 11 is a flowchart illustrating an intraprediction decoding method according to a first exemplary embodiment of the present invention. FIG. 11 illustrates intraprediction decoding when a current block to be decoded is intraprediction encoded using a flipped reference block.

Referring to FIGS. 10 and 11, in operation 1110, the intraprediction mode determining unit 961 determines an intraprediction mode of a current block among a plurality of intraprediction modes, including intraprediction modes using the flipped reference block, based on the intraprediction mode information extracted from the received bitstream.

In operation 1120, when the determined intraprediction mode uses the flipped reference block, the flipping unit 962 forms a flipped reference block by flipping pixels of a reference block to be used for intraprediction decoding symmetrically with respect to a straight line of a predetermined direction passing through the center of the reference block.

In operation 1130, the intraprediction performing unit 963 forms a predicted block by performing intraprediction decoding on a current block using the flipped reference block. The predicted block predicted by the intraprediction performing unit 963 is added to a residue included in the received bitstream, thereby being decoded.

Figure 12:
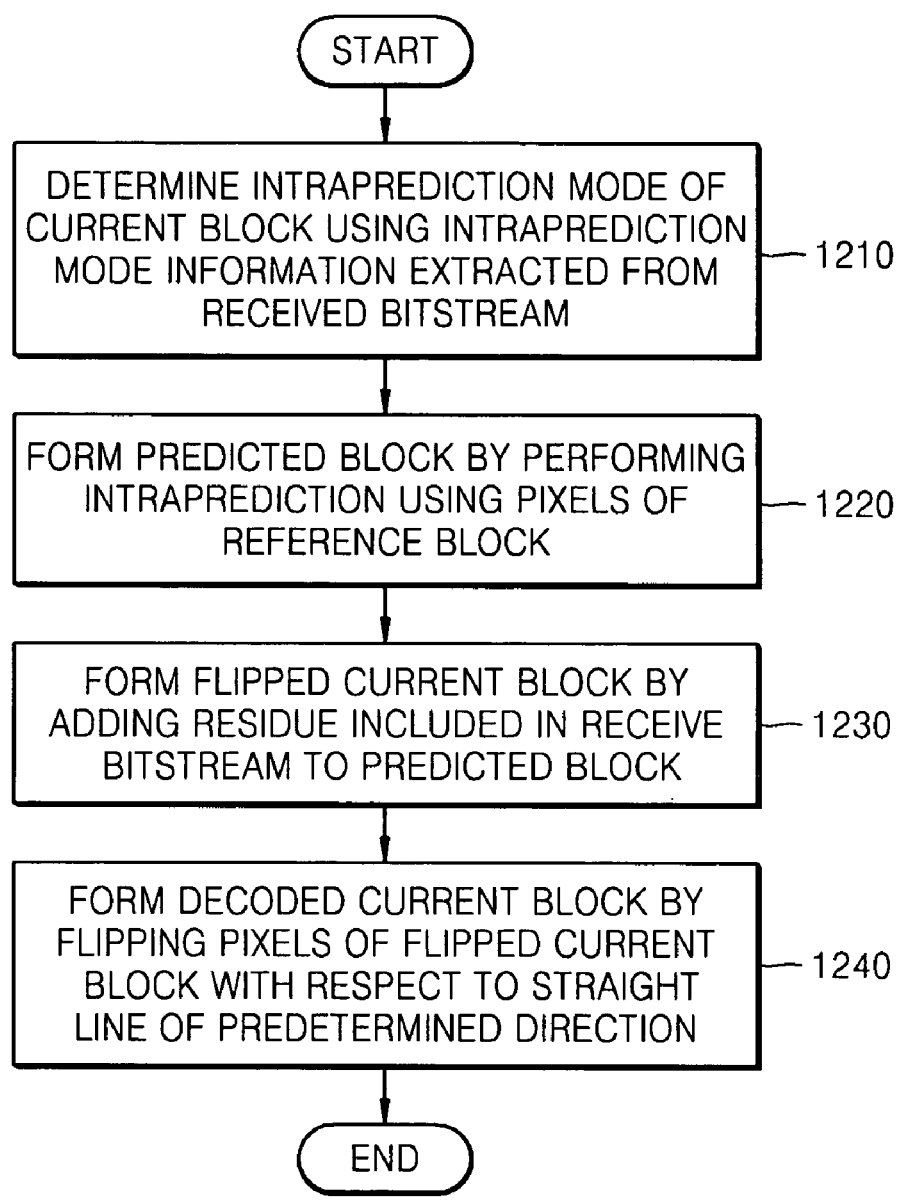
FIG. 12 is a flowchart illustrating an intraprediction decoding method according to a second exemplary embodiment of the present invention.

FIG. 12 is a flowchart illustrating an intraprediction decoding method according to a second exemplary embodiment of the present invention. FIG. 12 illustrates intraprediction decoding when a current block is flipped and then intraprediction encoded, i.e., intraprediction decoding on a block encoded by the intraprediction encoding method according the second exemplary embodiment of the present invention.

Referring to FIGS. 10 and 12, in operation 1210, the intraprediction mode determining unit 961 extracts the intraprediction mode information from the received bitstream and determines an intraprediction mode of a current block among a plurality of intraprediction modes including intraprediction modes using a flipped current block based on the extracted intraprediction mode information.

In operation 1220, when the determined intraprediction mode uses the flipped current block, the intraprediction performing unit 963 performs intraprediction on a current block using data of an already processed block, i.e., a reference block adjacent to the current block, thereby forming a predicted block.

In operation 1230, a residue included in the received bitstream is added to the predicted block to form a flipped current block. Here, when intraprediction is performed after flipping a current block, predetermined information indicating flipping and a residue between a predicted block and the original current block are stored in the encoded bitstream. Thus, the predicted block after passing through an addition process in operation 1230 becomes the flipped current block.

In operation 1240, the flipping unit 962 forms a decoded current block by flipping pixels of the flipped current block symmetrically with respect to a straight line of a predetermined direction passing through the center of the flipped current block.

As described above, according to the present invention, by reducing an error between an intrapredicted block and the original block, video compression efficiency can be improved.

Meanwhile, the present invention can also be embodied as a computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves. The computer-readable recording medium can also be distributed over network coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An intraprediction encoding method comprising:
    forming a flipped reference block by flipping pixels of a reference block used for intraprediction symmetrically with respect to a straight line of a predetermined direction passing through the center of the reference block;
    performing intraprediction using the flipped reference block; and
    adding intraprediction mode information, including information on whether the flipped reference block is used and the predetermined direction of the straight line, to a header of a bitstream of an encoded video, if intraprediction is performed using the flipped reference block.

2. The intraprediction encoding method of claim 1, wherein the predetermined direction of the straight line is one of a vertical direction and a horizontal direction.

3. The intraprediction encoding method of claim 1, wherein the reference block is a block(s) at least one of adjacent above and adjacent on the left side of the current block.

4. An intraprediction encoding method comprising:
    forming a flipped current block by flipping pixels of a current block to be intrapredicted symmetrically with respect to a straight line of a predetermined direction passing through the center of the current block;
    performing intraprediction on the flipped current block using pixels of a reference block adjacent to the flipped current block; and
    adding intraprediction mode information, including information on whether the flipped current block is used and the predetermined direction of the straight line, to a header of a bitstream of an encoded video, if intraprediction is performed after flipping the current block.

5. The intraprediction encoding method of claim 4, wherein the predetermined direction of the straight line is one of a vertical direction and a horizontal direction.

6. An intraprediction encoding apparatus comprising:
    a flipping unit which forms a flipped reference block by flipping pixels of a reference block used for intraprediction symmetrically with respect to a straight line of a predetermined direction passing through the center of the reference block; and
    an intraprediction performing unit which performs intraprediction using the flipped reference block,
    wherein the intraprediction performing unit adds intraprediction mode information, including information on whether the flipped reference block is used and the predetermined direction of the straight line, to a header of a bitstream of an encoded video, if intraprediction is performed using the flipped reference block.

7. An intraprediction encoding apparatus comprising:
a flipping unit which forms a flipped current block by flipping pixels of a current block to be intrapredicted symmetrically with respect to a straight line of a predetermined direction passing through the center of the current block; and
an intraprediction performing unit which performs intraprediction on the flipped current block using pixels of a reference block adjacent to the flipped current block,
wherein the intraprediction performing unit adds intraprediction mode information, including information on whether the flipped current block is used and the predetermined direction of the straight line, to a header of a bitstream of an encoded video, if intraprediction is performed after flipping the current block.

8. An intraprediction decoding method, in which an encoded video bitstream is received and intraprediction decoding is performed, the intraprediction decoding method comprising:
extracting intraprediction mode information from the received bitstream and determining an intraprediction mode of a current block among a plurality of intraprediction modes including an intraprediction mode using a flipped reference block based on the extracted intraprediction mode information;
forming the flipped reference block by flipping pixels of a reference block used for intraprediction decoding symmetrically with respect to a straight line of a predetermined direction passing through the center of the reference block, if the determined intraprediction mode uses the flipped reference block; and
forming a predicted block by performing intraprediction decoding on the current block using the flipped reference block.

9. The intraprediction decoding method of claim 8, wherein the intraprediction mode information includes information about the predetermined direction of the straight line.

10. An intraprediction decoding method, in which an encoded video bitstream is received and intraprediction decoding is performed, the intraprediction decoding method comprising:
extracting intraprediction mode information from the received bitstream and determining an intraprediction mode of a current block among a plurality of intraprediction modes including an intraprediction mode using a flipped current block based on the extracted intraprediction mode information;
forming a predicted block by performing intraprediction on a current block using a reference block adjacent to the current block, if the determined intraprediction mode uses the flipped current block;
forming the flipped current block by adding an error included in the received bitstream to the predicted block; and
forming a decoded current block by flipping pixels of the flipped current block symmetrically with respect to a straight line of a predetermined direction passing through the center of the flipped current block.

11. The intraprediction decoding method of claim 10, wherein the intraprediction mode information includes information about the predetermined direction of the straight line.

12. An intraprediction decoding apparatus, in which an encoded video bitstream is received and intraprediction decoding is performed, the intraprediction decoding apparatus comprising:
an intraprediction mode determining unit, which extracts intraprediction mode information from the received bitstream and determines an intraprediction mode of a current block among a plurality of intraprediction modes including an intraprediction mode using a flipped reference block based on the extracted intraprediction mode information;
a flipping unit, which forms the flipped reference block by flipping pixels of a reference block used for intraprediction decoding symmetrically with respect to a straight line of a predetermined direction passing through the center of the reference block, if the determined intraprediction mode uses the flipped reference block; and
an intraprediction performing unit, which forms a predicted block by performing intraprediction decoding on the current block using the flipped reference block.

13. The intraprediction decoding apparatus of claim 12, wherein the intraprediction mode information includes information about the predetermined direction of the straight line.

14. An intraprediction decoding apparatus, in which an encoded video bitstream is received and intraprediction decoding is performed, the intraprediction decoding apparatus comprising:
an intraprediction mode determining unit, which extracts intraprediction mode information from the received bitstream and determining an intraprediction mode of a current block among a plurality of intraprediction modes including an intraprediction mode using a flipped current block based on the extracted intraprediction mode information;
an intraprediction performing unit, which forms a predicted block by performing intraprediction on a current block using a reference block adjacent to the current block, if the determined intraprediction mode uses the flipped current block;
an adding unit, which forms the flipped current block by adding an error included in the received bitstream to the predicted block; and
a flipping unit, which forms a decoded current block by flipping pixels of the flipped current block symmetrically with respect to a straight line of a predetermined direction passing through the center of the flipped current block.

15. The intraprediction decoding apparatus of claim 14, wherein the intraprediction mode information includes information about the predetermined direction of the straight line.

* * * * *